(12) United States Patent
Enyedy (10) Patent No.: US 9,117,154 B2
(45) Date of Patent: Aug. 25, 2015

(54) RADIO FREQUENCY IDENTIFICATION (RFID) TOGGLE SWITCH

(71) Applicant: LINCOLN GLOBAL, INC., City of Industry, CA (US)

(72) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 312 days.

(21) Appl. No.: 13/668,601

(22) Filed: Nov. 5, 2012

(65) Prior Publication Data

US 2014/0124493 A1 May 8, 2014

(51) Int. Cl.
*B23K 9/10* (2006.01)
*G06K 19/073* (2006.01)
*G06K 7/10* (2006.01)

(52) U.S. Cl.
CPC ........ *G06K 19/07309* (2013.01); *B23K 9/1006* (2013.01); *G06K 7/10* (2013.01)

(58) Field of Classification Search
USPC ........................................... 219/132, 137.71
See application file for complete search history.

(56) References Cited

U.S. PATENT DOCUMENTS

| | | | |
|---|---|---|---|
| 6,267,291 | B1 | 7/2001 | Blankenship et al. |
| 6,510,984 | B2 | 1/2003 | Blankenship et al. |
| 6,906,285 | B2 | 6/2005 | Zucker et al. |
| 7,032,814 | B2 | 4/2006 | Blankenship |
| 7,616,095 | B2 | 11/2009 | Jones et al. |
| 7,764,191 | B2 | 7/2010 | Hall et al. |
| 7,932,809 | B2 | 4/2011 | Nair et al. |
| 2004/0004113 | A1* | 1/2004 | Blankenship ................. 235/375 |
| 2006/0169685 | A1* | 8/2006 | Stanzel ..................... 219/137.31 |
| 2009/0302015 | A1 | 12/2009 | Feitzlmaier et al. |
| 2011/0091846 | A1 | 4/2011 | Kreindl et al. |

FOREIGN PATENT DOCUMENTS

| | | |
|---|---|---|
| CN | 201993784 U | 9/2011 |
| DE | 102010055855 A1 | 6/2012 |
| JP | 2008059116 A | 3/2008 |
| WO | 2007044135 A1 | 4/2007 |
| WO | 2008144785 A1 | 12/2008 |

OTHER PUBLICATIONS

Phase IV Engineering, Inc., A wireless sensor built into the tire's inflation stem makes daily tire pressure checking quick, accurate, and automatically documented, http://www.phaseivengr.com/p4main/Aerospace/tabid/145/Default.aspx, printed on Sep. 18, 2012, 2 pages.
RFID Sensor Systems, ST050 fully passive RFID temperature sensor Ranger™ tag, 2011, 2 pages.
Tagsense, Sensors, http://tagsense.com/index.php?option=com_content&view=category&id=58:sensors&layout=blog&Itemid=139, printed on Nov. 2, 2012, 2 pages.
Tagsense, ZT-500 Long-Range Active RFID Tag with Real-Time Clock, V2.0, 2010, 24 pages.

* cited by examiner

*Primary Examiner* — Brian Jennison
(74) *Attorney, Agent, or Firm* — Hahn, Loeser & Parks LLP (57) ABSTRACT

The invention described herein generally pertains to a system and method for managing a Radio Frequency Identification (RFID) system by employing a switching means to at least a portion of at least one RFID tag in order to activate or deactivate such RFID tag. The switching means allows the transmission of data between an RFID tag and RFID reader to be controlled.

18 Claims, 7 Drawing Sheets

RADIO FREQUENCY IDENTIFICATION (RFID) TOGGLE SWITCH

TECHNICAL FIELD

The invention described herein pertains generally to a system and method that controls Radio Frequency Identification (RFID) communication.

BACKGROUND OF THE INVENTION

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code (e.g., indicia) to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz). In general, an RFID system can include multiple components: tags, tag readers (e.g., tag transceivers), tag writers, tag-programming stations, circulation readers, sorting equipment, tag inventory wands, etc.

As mentioned, RFID systems typically facilitate managing inventory, shipping, and/or receiving for a retailer, a distributor, and/or a manufacturer. With the advance technological capabilities of an RFID system, what is needed is an expansion on the applications to which RFID is employed.

SUMMARY OF THE INVENTION

In accordance with the present invention, there is provided a process for managing a Radio Frequency Identification (RFID) system comprising the steps of: receiving a signal with an RFID tag from an RFID reader within a geographic range; controlling a portion of the RFID tag; employing at least one of an activation or a deactivation of the RFID tag based on the step of controlling; and transmitting a portion of data from the RFID tag to the RFID reader based on the step of employing.

In accordance with the present invention, there is provided a process for managing a Radio Frequency Identification (RFID) System comprising the steps of: transmitting a signal from an RFID reader to an RFID tag, the signal is received by the RFID tag within a geographic range, wherein the RFID tag is powered from a portion of the signal; controlling a portion of the RFID tag; employing at least one of an activation or a deactivation of the RFID tag based on the step of controlling; and receiving a portion of data from the RFID tag at the RFID reader based on said step of employing.

In accordance with the present invention, there is provided an apparatus that performs a welding operation that comprises: an RFID reader incorporated into a welder power source for the apparatus or a wire feeder for the apparatus; an RFID tag incorporated into a welder gun for the apparatus, wherein the RFID tag is powered by a signal received from the RFID reader; switching means to control a portion of the RFID tag to activate or deactivate a transmission from the RFID tag; and a controller that controls the apparatus based on the transmission from the RFID tag.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
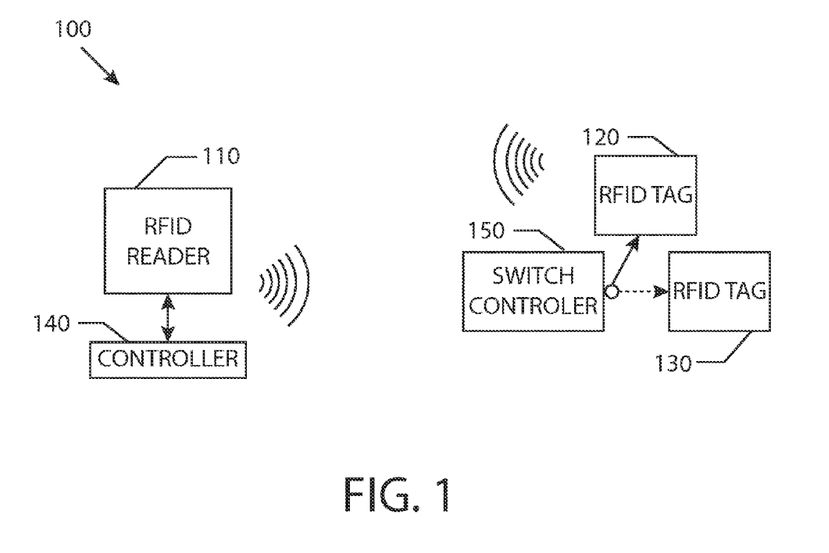
FIG. 1 is a block diagram illustrating a Radio Frequency Identification (RFID) system for managing transmissions between an RFID reader and at least one RFID tag.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates Radio Frequency Identification (RFID) system 100 for managing transmissions between RFID reader 110 and at least one RFID tag. RFID system 100 includes RFID reader 110 that communicates with at least one RFID tag. For instance, RFID system 100 can include any suitable number of RFID tags such as RFID tag 120 and RFID tag 130 (collectively referred to as "RFID tags," "at least one RFID tag," or "one or more RFID tags"). RFID tag 120 and/or RFID tag 130 can be an active tag (e.g., power source used to allow transmission from tag to reader) or a passive tag (e.g., a portion of a signal received from RFID reader 110 is used to power transmission from the tag to RFID reader 110). Moreover, it is to be appreciated that there can be any suitable number of RFID readers, corresponding sets of tags for each reader, and the like. RFID reader 110 communicates wirelessly with at least one RFID tag based on a geographic range or distance therebetween. For instance, based on at least one of a frequency, power source (e.g., passive tag, active tag, amount of power from power source), among others, the geographic range or distance can vary. In any event, when the frequency and/or power source allow wireless communication between at least one tag and RFID reader 110, data is communicated from at least one RFID tag to RFID reader 110. RFID reader 110 can receive the communication and control at least one of a device, a method, a system, an apparatus, and/or any combination thereof. It is to be appreciated that RFID reader 110 can utilize a controller to control a device, method, system, apparatus, and the like based on the received data communicated from at least one RFID tag. It is to be appreciated and understood that data received at RFID reader 110 is utilized by controller 140 to manage a device, method, system, apparatus, and the like while switch controller 150 manages activation or deactivation of a portion of at least one RFID tag.

RFID system 100 further includes switch controller 150 that controls a portion of at least one RFID tag (e.g., RFID tag 120, RFID tag 130), wherein such control employs an activation of the tag (e.g., RFID tag 120, RFID tag 130) or a deactivation of the tag. In general, switch controller 150 enables or disables at least one RFID tag regardless of whether such tag is within the geographic range for wireless communication. For instance, data can be communicated from RFID tag 120 to RFID reader 110 when RFID reader 110 and RFID tag 120 are within a geographic proximity of one another (e.g., prescribed distance that enables wireless communication there between) and switch controller 150 activates RFID tag 120. In another example, data may not be communicated from RFID tag 120 to RFID reader 110 when RFID reader 110 and RFID tag 120 are within a geographic proximity of one another (e.g., prescribed distance that enables wireless communication there between) and switch controller 150 deactivates RFID tag 120.

In an embodiment, two or more RFID tags (e.g., RFID tag 120, RFID tag 130) can be employed with switch controller 150, wherein switch controller 150 can close or open a connection within an RFID tag. The open or close connection enables or disables the RFID tag to communicate when within geographic proximity with RFID reader 110. When controller switch 150 is toggled in to one position, RFID tag 120 can be switched off (e.g., deactivated) and RFID tag 130 can be switched on (e.g., activated), wherein the switched on RFID tag (e.g., here, RFID tag 130) can communicate with RFID reader 110 whereas the switched off RFID tag (e.g., here, RFID tag 120) cannot communicate (e.g., regardless if both RFID tags are within geographic proximity of RFID reader 110). For instance, a conventional configuration would have both RFID tags active and communicating with RFID reader 110 upon being within a prescribed distance or within a geographic proximity of RFID reader 110.

It is to be appreciated that switch controller 150 can employ a switching means to a portion of an RFID tag in order to provide an activation or a deactivation thereof. By way of example and not limitation, the switching means can be a short, a coil modification (e.g., a coil short, an open coil, among others), a mechanical shield, a single pole switch, a double pole switch, among others. For instance, in a particular example, switch controller 150 can employ a switch module that can activate or deactivate a coil in an RFID tag with a short. In another particular example, a mechanical shield can be employed with an RFID tag to eliminate wireless communication from said RFID tag and/or to eliminate receipt of a signal from RFID reader 110. It is to be appreciated that switch controller 150 can prevent or allow wireless communication between RFID reader 110 and at least one RFID tag (e.g., RFID tag 120, RFID tag 130).

In another embodiment, a pairing can be implemented between at least one RFID tag and RFID reader 110. For instance, RFID reader 110 can be configured to have two or more states. By way of example and not limitation, a first power state can be a low power state and a second power state can be a high power state such that each RFID tag can include a defined data transmission if within a prescribed distance to RFID reader 110. In other words, each RFID tag can include a first power state with a first geographic location and a second power state with a second geographic location. Upon detection of an activated RFID tag at or about the first geographic location, a first particular response can be communicated. Upon detection of an activated RFID tag at or about the second geographic location, a second particular response can be communicated. It is to be appreciated that an RFID tag and RFID reader 110 can include any suitable number of output states as well as any suitable number of geographic locations. For instance, an RFID system can include five (5) geographic locations that correspond to five (5) output states.

It is to be appreciated that a repeater can be utilized with RFID system 100 as well as other systems and/or embodiments described herein. In general, a repeater can boost or increase a signal transmission between at least one RFID tag and RFID reader 110. In an example, a transmission from an RFID tag is received at a repeater and communicated to an RFID reader. In another example, a transmission from an RFID reader is received and communicated to an RFID tag. Thus, it is appreciated that any suitable number of repeaters can be utilized with RFID system 100.

Figure 2:
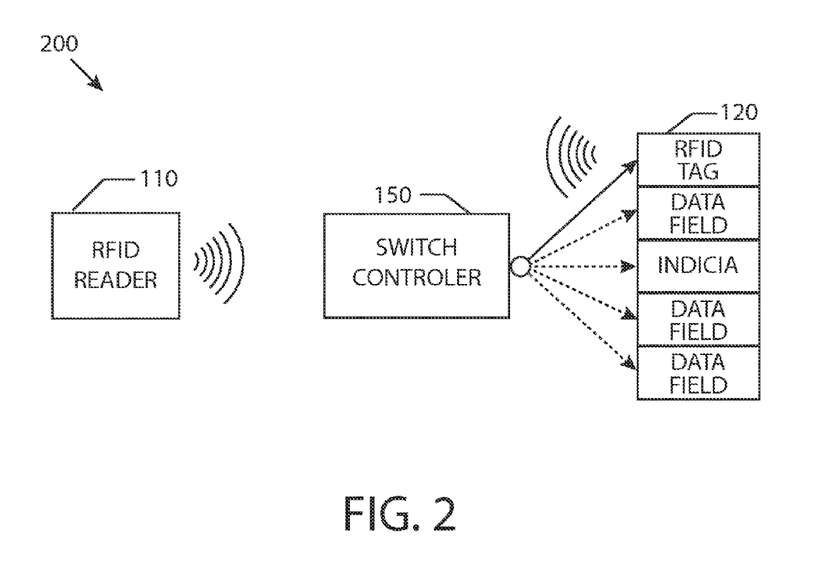
FIG. 2 is a block diagram illustrating an RFID system for controlling a portion of an RFID tag in order to manage RFID communications.

Turning to FIG. 2, RFID system 200 illustrates an RFID system for controlling a portion of an RFID tag in order to manage RFID communications. RFID tag 120 can include at least one of an indicia and a data field. For instance, the indicia can be, but is not limited to being, a serial number, a unique identification, a sequence of numbers, a sequence of characters and numbers, among others). Further, RFID tag 120 can include one or more data fields. Data fields can include any suitable data that can be communicated from RFID tag 120 to RFID reader 110.

Switch controller 150 can control a portion of RFID tag 120 in order to active or deactivate a portion of RFID tag 120. In other words, switch controller 150 can activate or deactivate at least one of a data field of RFID tag 120, an indicia of RFID tag 120, and/or a combination thereof. It is to be appreciated that although RFID tag 120 is depicted, any suitable number of RFID tags and/or RFID readers can be utilized with the subject invention and the subject invention is not limited to such depicted example.

As discussed, each RFID tag can include at least one of indicia or a data field. Switch controller 150 can control a portion of RFID tag 120 in order to select (e.g., activate, deactivate) one or more of the indicia or data field(s) for each RFID tag. In another embodiment, RFID tag 120 can include an indicia and a data field, wherein an input on RFID tag 120 can trigger a data field or indicia to switch between one state and another. For example, an RFID tag may have serial number 0100 and a data field of 0100. When the switch is moved to an alternate position, the data field can change to 0101.

As discussed above, each RFID tag can include indicia (e.g., serial number, identifier, data field, among others). RFID reader 110 can identify each RFID tag (e.g., RFID tag 120, among others) based on such indicia, wherein each indicia for each RFID tag can specify a particular response or output upon receipt (e.g., receipt being a communication received from an activated RFID tag). For example, a controller can drive a device, system, method, or apparatus based on a received transmission from RFID system 200. By way of example and not limitation, an output (e.g., current, voltage, resistance, power, among others) can be modified (e.g., increased, decreased) based on a communication from RFID tag 120 received by RFID reader 110. In a particular example, the modification can be based on the time in which an RFID tag is active. In still another example, an output can be turned on or off based upon which RFID tag is read by RFID reader 110.

Figure 3:
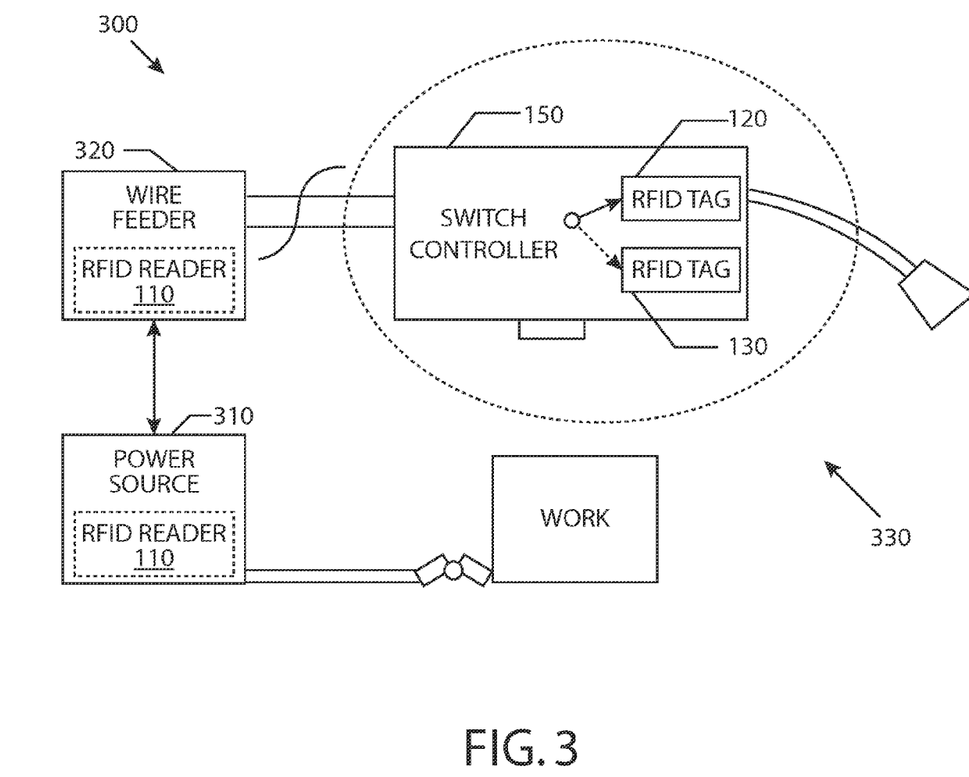
FIG. 3 is a block diagram illustrating a welding apparatus that uses an RFID system.

FIG. 3 illustrates a welding apparatus 300 that uses an RFID system. In a conventional welding apparatus, a mechanical cable connects a welder gun to either a power source for the welding apparatus and/or a wire feeder for the welding apparatus. The mechanical cable includes a physical connection that carries consumable (e.g., wire), power, and/or control parameter(s). Over time, the mechanical cable can wear from use and/or mechanically deteriorate. The deterioration of the mechanical cable can compromise signal delivery of power, control parameter(s), among others for the welding apparatus. Utilizing RFID system 100 and/or RIFD system 200 alleviates the concern regarding mechanical wear or mechanical failure by the implementation of switch controller 150, one or more RFID tags, and RFID reader 110.

RFID reader 110 can be incorporated into a power source 310 for welding apparatus 300, incorporated into a wire feeder 320 for welding apparatus 300, and/or a suitable combination thereof. At least one RFID tag (e.g., RFID tag 120, RFID tag 130) can be incorporated into welder gun 330. Moreover, welder gun 330 can include switch controller 150 that can be configured to activate or deactivate a portion of an RFID tag. RFID reader 110, at least one RFID tag, and switch controller 150 enable a control parameter to be communicated from at least one of power source 310 or wire feeder 320 to welder gun 330.

In general, RFID reader 110, one or more RFID tags, and switch controller 150 can be employed to replace a hard wire control line (e.g., mechanical cable) utilized to communicate control parameter(s) to welding gun 330 in welding apparatus 300. By way of example and not limitation, a plurality of RFID tags can be employed with welder gun 330, wherein each RFID tag can be activated based upon a manual activation (e.g., a push button for each RFID tag, a keypad, among others) by an operator. Thus, a manual activation can correspond to an activation of at least one RFID tag (and/or deactivation of an RFID tag) as well as a control output based on the received data from the activated RFID tag or data not received from the deactivated RFID tag. In another embodiment, an automatic activation and/or deactivation can be utilized in order to activate or deactivate at least one RFID tag respectively.

By way of example and not limitation, an RFID system can provide wireless communication between components (e.g., welder gun 330, welder power source 310, welder wire feeder 320, among others) within welding apparatus 300. The welding apparatus 300 can include a plurality of RFID tags (e.g., RFID tag 120, RFID tag 130) that can communicate with RFID reader 110, wherein switch controller 150 can manage an activation or a deactivation of a portion of each RFID tag. Based on the activation or deactivation, RFID reader 110 receives a communication that can control a device, a system, a method, welding apparatus, among others. For instance, RFID reader 110 can be incorporated into power source 310, wire feeder 320, and/or a suitable combination thereof. RFID reader 110 can be programmed to and/or interface with a processor to modify control values, set outputs, or otherwise appropriately respond when receiving communication from an activated RFID tag based on the control of activation or deactivation from switch control 150.

In another embodiment, a pairing can be implemented between at least one RFID tag and RFID reader 110. For instance, RFID reader 110 can be configured to have two or more states. By way of example and not limitation, a first power state can be a low power state and a second power state can be a high power state such that each RFID tag can provide a data transmission if within a prescribed distance to RFID reader 110. In other words, each RFID tag can include a first power state with a first geographic location and a second power state with a second geographic location. Upon detection of an activated RFID tag at or about the first geographic location, a first particular response (e.g., power state, output, data field, etc.) can be communicated. Upon detection of an activated RFID tag at or about the second geographic location, a second particular response (e.g., power state, output, data field, etc.) can be communicated.

Following such example, a device can be utilized in a low power state based on distance and configured data transmission from a first RFID tag, whereas a high power state can be utilized on a disparate distance and configured data transmitted from a second RFID tag. By way of example and not limitation, welding apparatus 300 can include welder gun 330 and a remote control close to at least one of power source 310 of the welder apparatus or wire feeder 320 of welding apparatus 300. A distance between welder gun 330 and the remote control within a range of one foot (e.g., twelve inches) can activate a lower power state for welding apparatus 300, whereas a distance greater than one foot (e.g., twelve inches) can initiate a high power state. It is to be appreciated that a high power state and a low power state is solely for example and not to be limiting on the subject invention.

Figure 4:
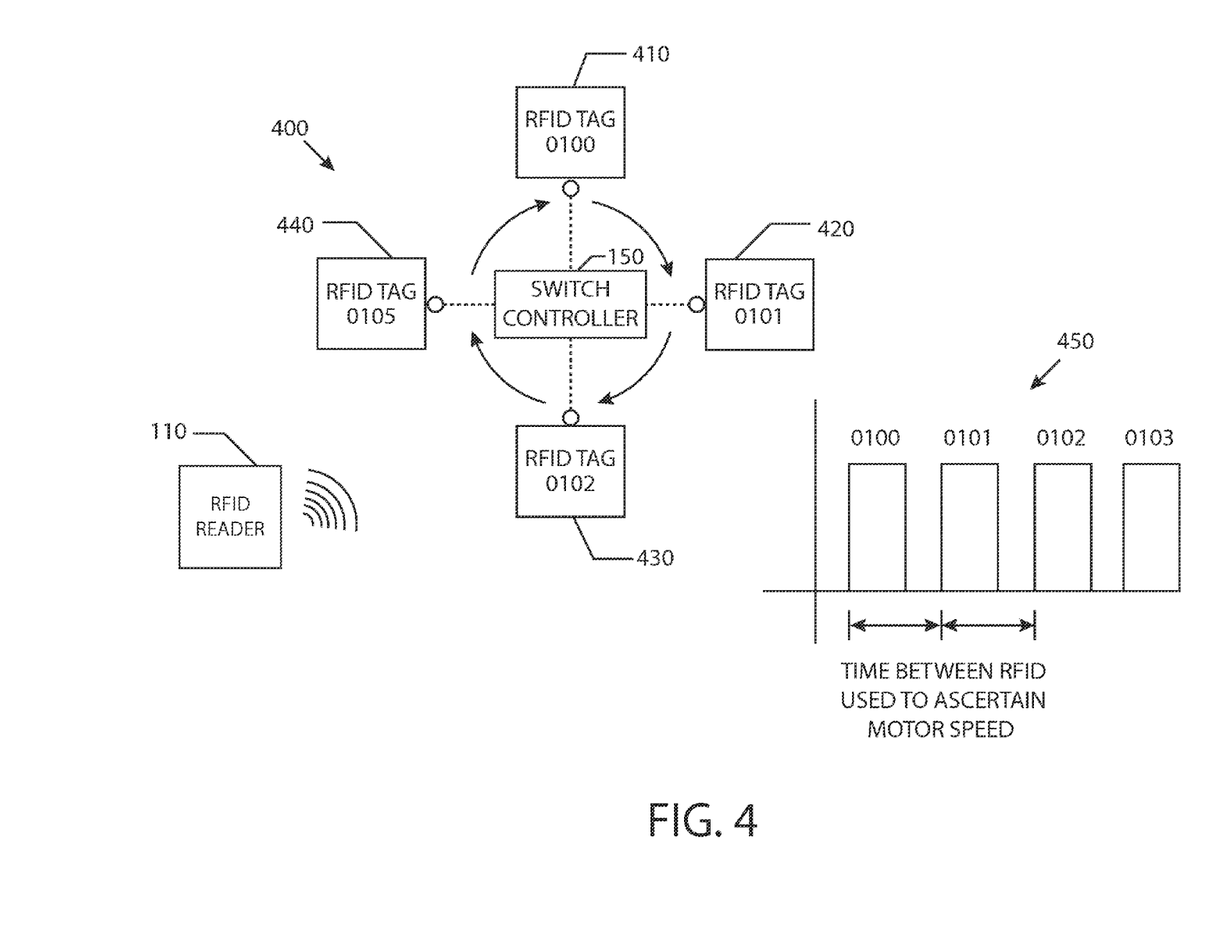
FIG. 4 is a block diagram illustrating an RFID system for a rotary motor.

FIG. 4 illustrates RFID system 400 for a rotary motor. RFID system 400 includes RFID tag 410, RFID tag 420, RFID tag 430, and RFID tag 440 that can communicate wirelessly with RFID reader 110. As discussed, any suitable number of RFID tags can be implemented with RFID system 400. RFID system 400 can further include switch controller 150 that can control a portion of each RFID tag in order to employ an activation or a deactivation of an RFID tag within RFID system 400. In particular, switch controller 150 can be associated with a motor shaft or a rotary motor such that switch controller 150 can activate or deactivate an RFID tag based on a rotary location. For instance, a rotary motor can be utilized to control a portion of an RFID tag, wherein the rotary motor can rotate within a range from 0 degrees to 360 degrees. Each RFID tag (e.g., RFID tag 410, RFID tag 420, RFID tag 430, and RFID tag 440) can be configured with a range, wherein the configuration enables a tag to communicate data (e.g., activate) based on the configured range being triggered by the rotation of the rotary motor. For instance, if a tag is configured at 45 degrees, when the motor rotates (e.g., activates) 45 degrees, the tag can be activated and/or deactivated to communicate or not communicate data.

In another embodiment, a plurality of RFID tags can be employed by a rotary encoder application to identify the rotational application of a mechanical system wherein an array of RFID tags are activated as the mechanical operation is rotated through a 360 degree motion. The use of passive RFID tags with RFID reader 110 can obviate the need to power source such tags. However, it is to be appreciated that the RFID tags (e.g., RFID tag 410, RFID tag 420, RFID 430, and RFID tag 440) can be an active RFID tag or a passive RFID tag. Additionally, graph 450 illustrates an activation of an RFID tag and a duration of such activation. Graph 450 can be utilized to identify motor speed, motor rotational speed, and the like. In general, the time between each RFID tag activation can be utilized to ascertain a motor speed.

Figure 5:
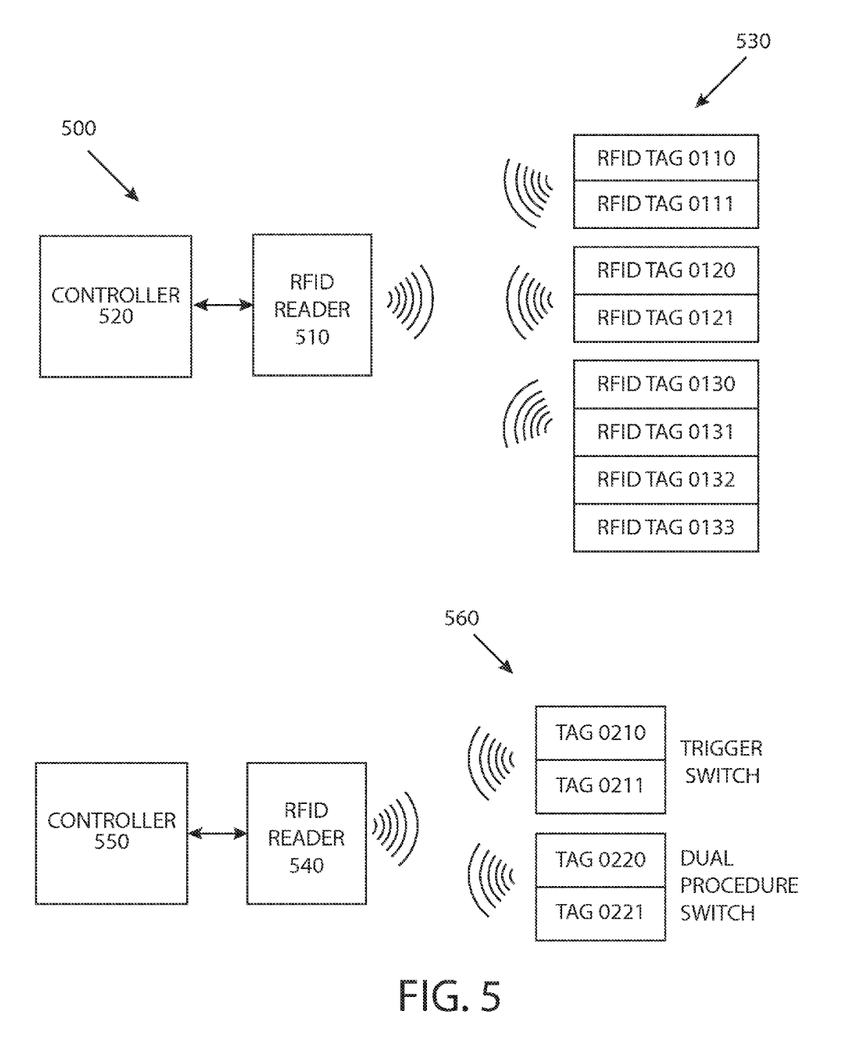
FIG. 5 is a block diagram illustrating an RFID system that uses multiple RFID components and one or more sets of RFID tags.

FIG. 5 illustrates RFID system 500 that uses multiple RFID components and one or more sets of RFID tags. RFID system 500 can include RFID reader 510 that is configured to communicate with first set of RFID tags 530, wherein such communication is utilized by controller 520 to control or manage a device, system, method, apparatus, and/or a combination thereof. For instance, first set of RFID tags 530 can include a trigger switch configuration (e.g., switch controller activates or deactivates one or more RFID tag), a dual procedure switch (e.g., switch controller activates or deactivates a portion of at least one RFID tag), or a motor encoder (e.g., switch controller associated with a rotary motor and at least one RFID tag).

RFID system 500 further includes RFID reader 510 that is configured to received communications from second set of RFID tags 560, wherein such communication is implemented by controller 550 to control or manage at least one of a device, an apparatus, a system, a method, and/or a combination thereof. For instance, second set of RFID tags can include a trigger switch or a dual procedure switch.

Figure 6:
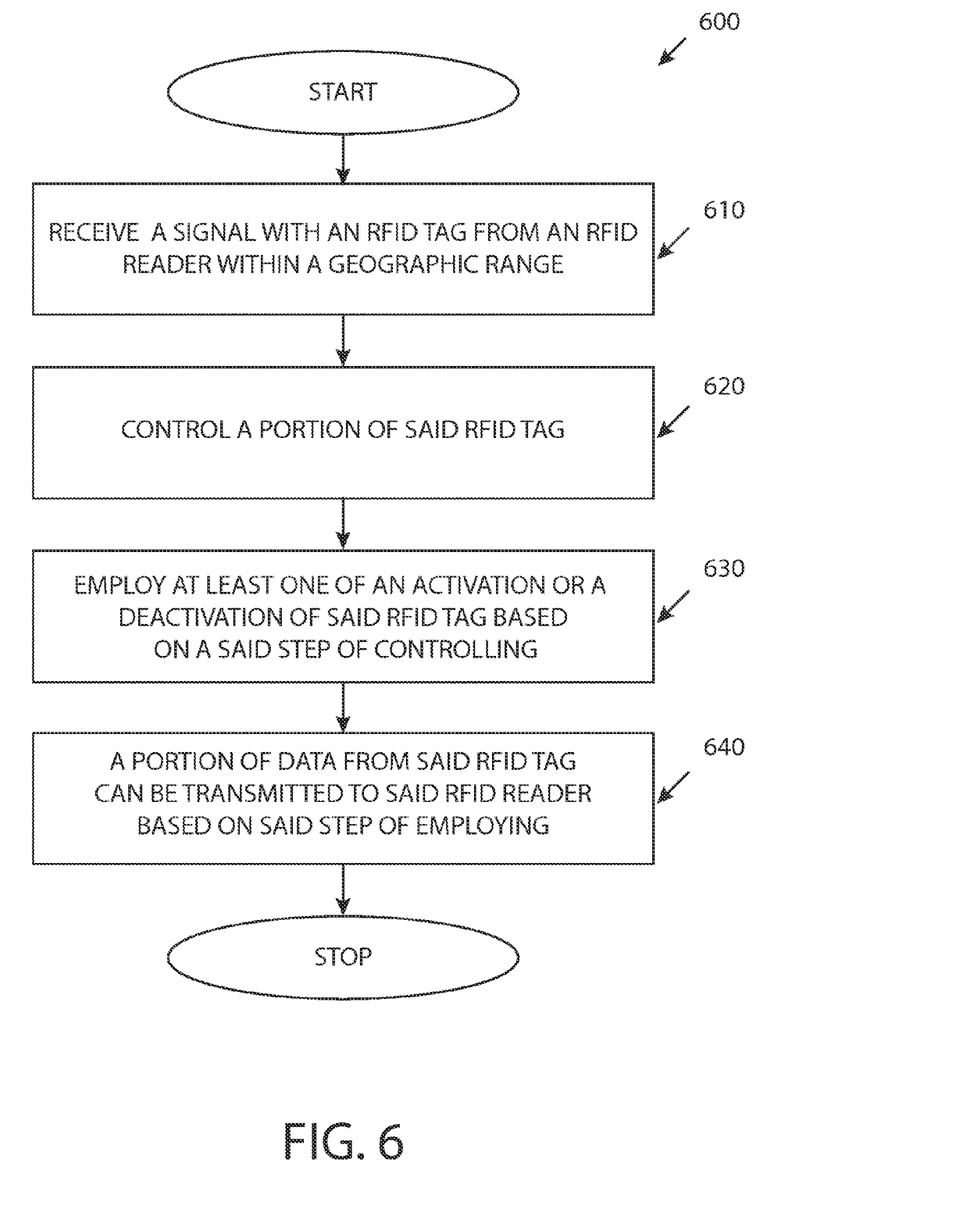
FIG. 6 is a flow diagram of transmitting a portion of data from an RFID tag based on an activation of said RFID tag from an RFID reader and a switching means.

Sequentially, the following occurs as illustrated in the decision tree flow diagram 600 of FIG. 6. A signal can be received with an RFID tag from an RFID reader within a geographic range (reference block 610). A portion of said RFID tag can be controlled (reference block 620). By way of example and not limitation, the portion of the RFID tag that can be controlled can be at least one of a coil, an antenna, a receiver, a transponder, among others. For instance, a switching means can be utilized to control a portion of said RFID tag, wherein the switching means can be, but is not limited to being, a short, a coil modification (e.g., a coil short, an open coil, among others), a mechanical shield, a single pole switch, a double pole switch, among others. At least one of an activation or a deactivation of said RFID tag can be employed based on said step of controlling (reference block 630). A portion of data from said RFID tag can be transmitted to said RFID reader based on said step of employing (reference block 640).

Figure 7:
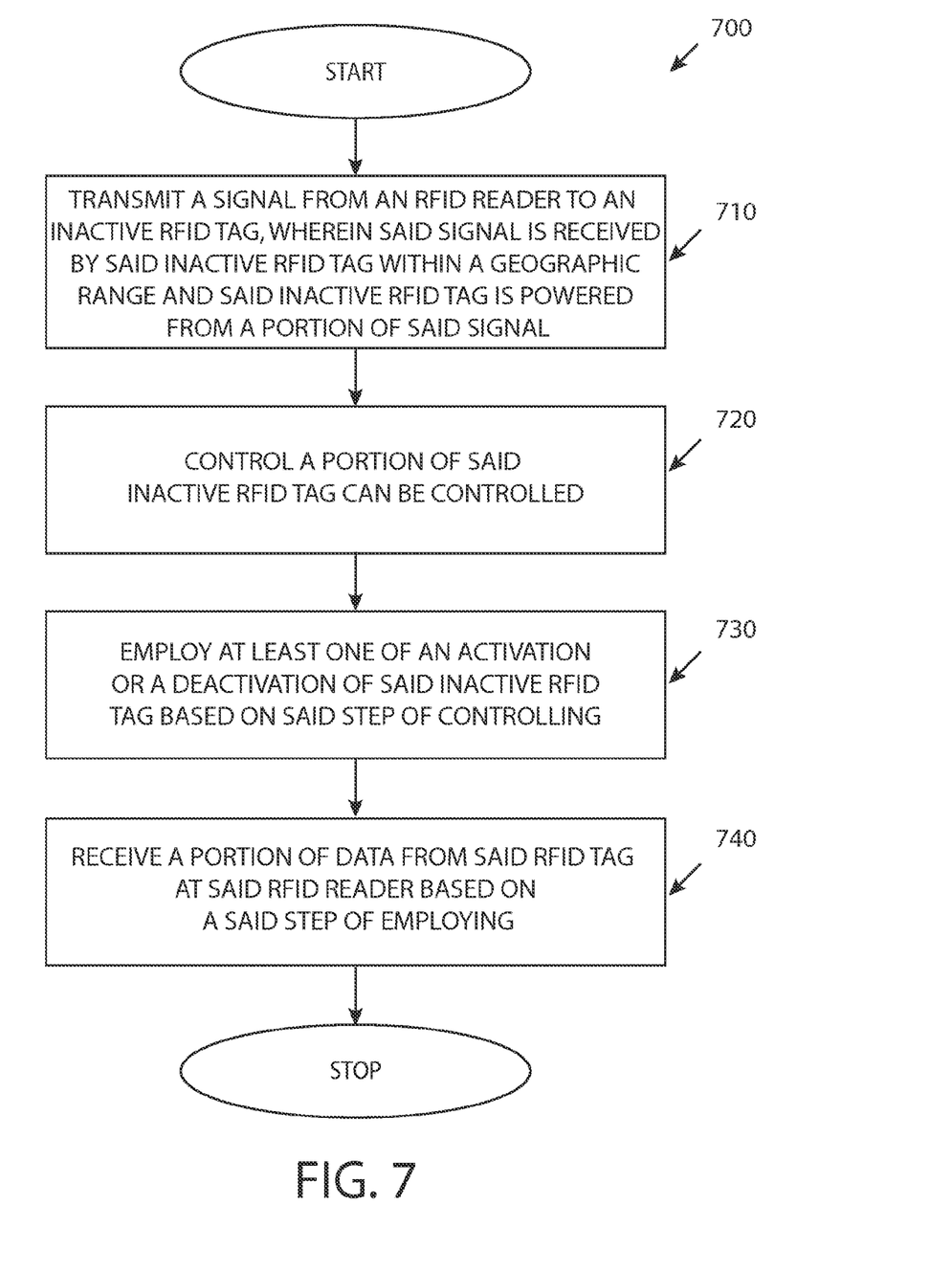
FIG. 7 is a flow diagram of receiving a portion of data from an RFID tag based on an activation of said RFID tag from an RFID reader and a switching means.

The following occurs as illustrated in the flow diagram 700 of FIG. 7. A signal from an RFID reader can be transmitted to a passive RFID tag, wherein the signal is received by the passive RFID tag within a geographic range and the passive RFID tag is powered from a portion of the signal (reference block 710). A portion of the passive RFID tag can be controlled (reference block 720). For instance, a portion of the RFID tag can be controlled by employment of a short, a coil modification (e.g., a coil short, an open coil, among others), a mechanical shield, a single pole switch, a double pole switch, among others. At least one of an activation or a deactivation of the passive RFID tag can be employed based on the step of controlling (reference block 730). A portion of data from the RFID tag can be received at the RFID reader based on the step of employing (reference block 740).

Figure 8:
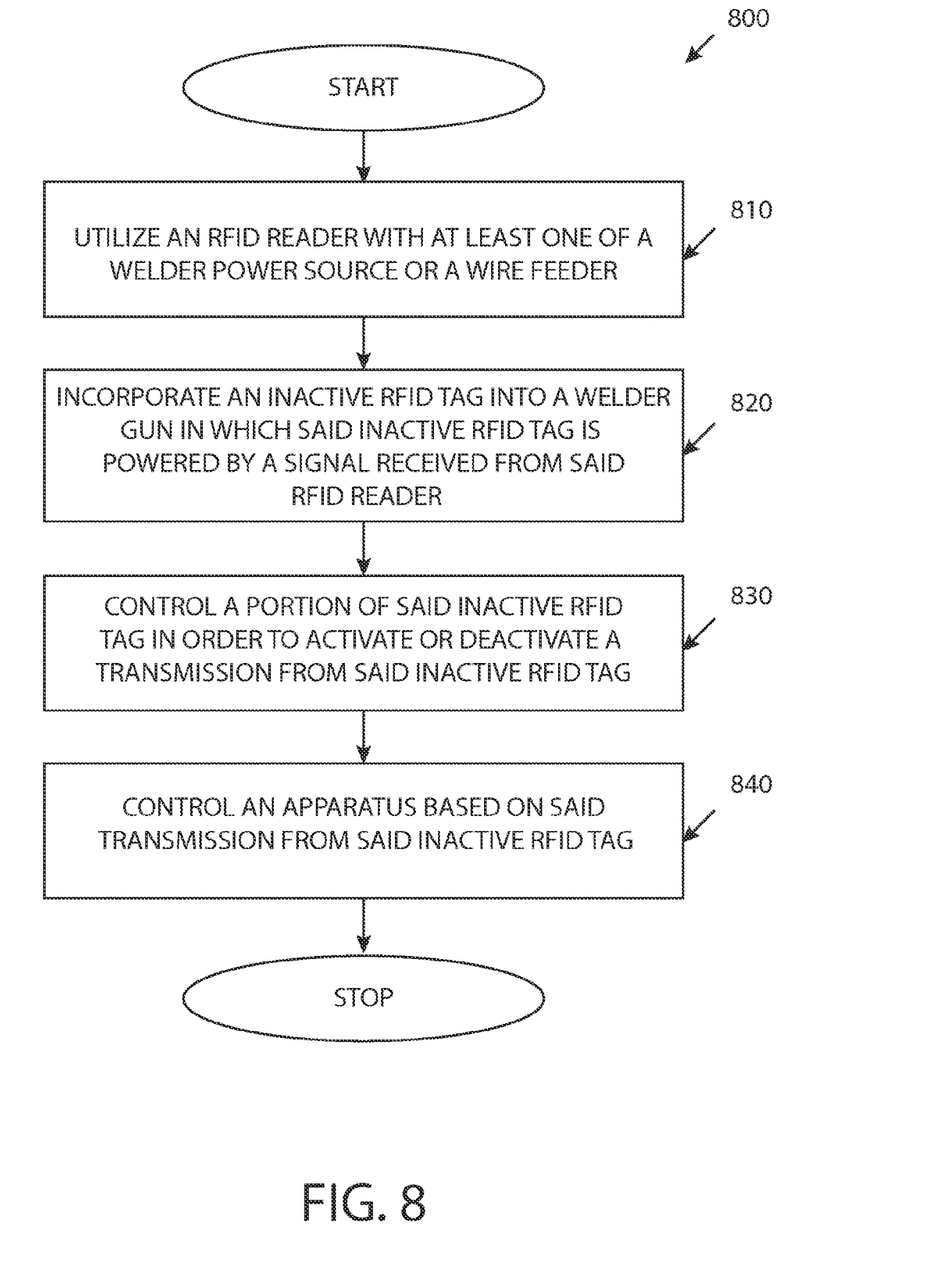
FIG. 8 is a flow diagram of controlling an output value for a welding apparatus based on a portion of data received from an RFID tag.

The following occurs as illustrated in the flow diagram 800 of FIG. 8. An RFID reader is utilized with at least one of a welder power source or a wire feeder (e.g., welder wire feeder) (reference block 810). A passive RFID tag is incorporated into a welder gun in which the passive RFID tag is powered by a signal received from the RFID reader (reference block 820). A portion of the passive RFID tag is controlled in order to activate or deactivate a transmission from the passive RFID tag (reference block 830). For instance, the control can be provided by a switching means. A controller can control an apparatus based on the transmission from the passive RFID tag (reference numeral 840). By way of example and not limitation, the apparatus can be an apparatus that performs a welding operation. In another example, the apparatus can be a device, a method, a system, or a combination thereof.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. An apparatus, comprising:
   a power source that creates an arc between a workpiece and an electrode;
   a wire feeder that is connected to a supply of welding wire and provides a welding wire to a puddle formed by the electrode;
   a first RFID tag and a second RFID tag in communication with a controller switch;
   an RFID reader that communicates a wireless signal to the controller switch based on the controller switch being within a geographic proximity of the RFID reader;
   the controller switch that receives the wireless signal from the RFID reader and employs the following:
      an activation, of the first RFID tag or the second RFID tag, for receipt of the wireless signal at an activated RFID tag; and
      a deactivation, of the first RFID tag or the second RFID tag, to eliminate receipt of the wireless signal at a deactivated RFID tag; and
   the activated RFID tag communicates a data stored thereon to the RFID reader; and
   a controller that controls the power source or the wire feeder based on the data received from the RFID reader.

2. The apparatus of claim 1, wherein the controller modifies an output of the wire feeder or the power source based on the data received from the activated tag.

3. The apparatus of claim 1, wherein the output is at least one of a current, a voltage, a resistance, or a power of the power source.

4. The apparatus of claim 1, wherein the controller modifies an output of the apparatus.

5. The apparatus of claim 4, wherein the output is a memory selection.

6. The apparatus of claim 4, wherein the output is a welding mode for the apparatus.

7. The apparatus of claim 4, wherein the output is an engine drive for the apparatus.

8. The apparatus of claim 1, wherein an manual selection from a user can employ the activated RFID tag.

9. The apparatus of claim 1, wherein the first RFID tag or the second RFID tag are incorporated into a gun that aims the welding wire for delivery to the puddle.

10. The apparatus of claim 1, wherein the RFID reader is incorporated into the power source or the wire feeder.

11. The apparatus of claim 1, wherein the data includes an indicia and at least one data field.

12. The apparatus of claim 1, wherein the first RFID tag or the second RFID tag is a passive RFID tag that is powered from the wireless signal to communicate the data.

13. The apparatus of claim 1, the controller switch further comprising a mechanical shield that eliminates receipt of the wireless signal for the deactivated RFID tag.

14. An apparatus, comprising:
a power source that creates an arc between a workpiece and an electrode;
a first RFID tag having one or more indicia corresponding to one or more data fields that store a data;
an RFID reader that communicates wirelessly with the first RFID tag based on the RFID reader being within a geographic proximity of the first RFID tag;
a controller switch that receives an input selection identifying the one or more indicia;
the controller switch further communicates the data corresponding to the input selection of the indicia to the RFID reader;
the controller switch further eliminates receipt of the data at the RFID reader from the data field of the first RFID tag corresponding to the indicia not identified by the input selection; and
a controller that controls the power source or the apparatus based on the data received from the RFID reader.

15. The apparatus of claim 14, wherein the data is related to a control parameter that is output by the controller.

16. The apparatus of claim 14, wherein the control parameter is at least one of a voltage, a current, a resistance, a memory selection, or a mode for the system.

17. The apparatus of claim 14, wherein the input selection is a manual input.

18. The apparatus of claim 14, further comprising:
a wire feeder that delivers a welding wire to a puddle formed by the electrode; and
the controller controls the wire feeder based on the data received from the RFID reader.

* * * * *